United States Patent [19]

Geisthoff

[11] 4,437,782

[45] Mar. 20, 1984

[54] SPLINED HUB ASSEMBLY FOR CONNECTING TWO SHAFTS

[75] Inventor: Hubert Geisthoff, Lohmar, Fed. Rep. of Germany

[73] Assignee: Jean Walterscheid GmbH, Lohmar, Fed. Rep. of Germany

[21] Appl. No.: 454,233

[22] Filed: Dec. 29, 1982

[30] Foreign Application Priority Data

Jan. 14, 1982 [DE] Fed. Rep. of Germany ....... 3200846

[51] Int. Cl.³ .............................................. F16D 1/12
[52] U.S. Cl. .................................... 403/13; 403/359; 308/6 R; 74/15.8; 464/158
[58] Field of Search ......... 308/6 R; 403/359, DIG. 8, 403/328, 109, 166, 13, 14; 74/15.8, 15.6; 464/158, 154

[56] References Cited

U.S. PATENT DOCUMENTS

| | | |
|---|---|---|
| 2,910,842 | 11/1959 | Sensenig . |
| 3,097,892 | 7/1963 | Newbury ............................ 308/6 R |
| 3,290,918 | 12/1966 | Weasler ........................... 403/359 X |
| 3,551,013 | 12/1970 | Trojanowski ................... 403/359 X |
| 4,318,630 | 3/1982 | Herchenback et al. ........ 403/359 X |

FOREIGN PATENT DOCUMENTS 1203245  8/1970  United Kingdom ................. 403/13

Primary Examiner—Cornelius J. Husar
Assistant Examiner—Joseph A. Fischetti
Attorney, Agent, or Firm—Toren, McGeady and Stanger

[57] ABSTRACT

An assembly for joining together two splined shafts adapted to facilitate angular alignment of the splines relative to each other wherein one of the shafts is a splined hub having an opening formed in the wall thereof within which a ball is held with a given degree of play to enable rotation thereof, the center of the opening being in an axial plane with the center of one of the splines of the splined hub. The axial distance between the centerline of the opening and an end of the splined hub is identical to or greater than the axial length of a centering cylindrical surface formed between the splined hub end and the termination of the splines within the splined hub. The cylindrical centering surface engages the outer diameter of the splines of a splined shaft which is to be joined with the splined hub in order to ensure axial alignment between the shafts, with the ball engaging between splines of the splined shaft while being securely held in the opening so that the radial segment of the ball extending into the interior of the hub is equal to the gap between individual splines of the hub splined shaft.

4 Claims, 4 Drawing Figures

SPLINED HUB ASSEMBLY FOR CONNECTING TWO SHAFTS

The present invention relates generally to torque-transmitting connections and more particularly to a splined assembly for joining together a pair of shafts, particularly for connecting a power takeoff shaft of a tractor designed as a splined shaft with the drive shaft for driving an agricultural implement.

In devices of the type to which the present invention relates, normally the splined hub member has a profile which corresponds to the profile of the splined shaft member and a centering cylindrical surface is provided on the interior of the hub member at the end thereof at which the shaft member is inserted in order to effect axial guidance of the shaft member. The inner diameter of the centering cylindrical surface is formed to correspond approximately with the outer diameter of the shaft splines of the shaft member.

In the prior art, a splined assembly of the type to which the present invention relates is known from U.S. Pat. No. 2,910,842. In this device, a splined hub is provided which is formed at its slipon end with a centering cylindrical surface and which in the region of the centering cylindrical surface is provided with a radially inwardly pointing guide pin extending toward the slipon end for alignment of the splined hub relative to the associated splined shaft profile. The guiding pin cooperates with a splined shaft profile which is pointed at one end.

However, a disadvantage of the guiding pin arrangement arises in practical operation in that there occurs between the contact face and the pointed tapered face of the shaft part a high degree of friction which makes it difficult for an operator to slip the splined hub onto the splined shaft especially when high axial forces are involved.

The present invention is therefore directed toward providing a splined assembly wherein means for facilitating centering of the shafts are provided acting in the circumferential direction and wherein the friction between the centering means and the shaft spline in the starting position is reduced to a minimum.

SUMMARY OF THE INVENTION

Briefly, the present invention may be described as a spline assembly for connecting together a pair of shafts wherein one of the shafts is formed as a splined hub and the other as a splined shaft, the assembly comprising: hub spline means on the splined hub; a cylindrical inner centering surface extending between the termination of the hub spline means and an end of the splined hub; shaft spline means on said splined shaft arranged to be placed in torque-transmitting engagement with said hub spline means and having an outermost diameter, said cylindrical centering surface being formed with a diameter corresponding to said outermost diameter to guide said splined shaft into engagement with said splined hub; an opening extending through said splined hub having a ball located therein, said ball being arranged to have a segment thereof project inwardly into said hub to effect engagement of said ball with said splined shaft; said opening being positioned relative to said hub spline means so that said ball will engage between said shaft spline means when said splined shaft is arranged in engagement with said splined hub with the axial distance between the center of the opening and the end of the splined hub being equal to or smaller than the axial length of the cylindrical inner centering surface; and stop means provided in said opening for operatively retaining said ball therein, said stop means being arranged so that the greatest chord length of the ball segment projecting inwardly into the hub when the splined shaft and the splined hub are in engagement will be equivalent to the maximum width of the gap between individual splines of the shaft spline means.

The ends of the shaft spline means may be formed with tapered profiles arranged at an angle to facilitate starting engagement between the members. Also, the spline ends may be formed with an acuminated configuration so that an approximately trapezoidal starting face is obtained. In drive shafts used with splined hubs in agricultural implements, because of the limited space between, for example, a tractor and an implement to be attached thereto, when the splined hub is to be slipped onto the splined shaft it is difficult for the operator to obtain a clear view of the parts. Thus, with the provision of a centering aid, the shaft spline having a trapezoidal starting face may start against the centering aid and in such case the splined shaft may be turned to an extent so that the centering aid may be guided into a gap formed between two splines of the shaft.

The advantage of providing a ball rotatably held in the wall of the splined hub in accordance with the invention within the centering cylindrical surface of the splined hub involves the fact that it becomes possible for rotating movement of the splined hub relative to the splined shaft to enable engagement of the parts as a result of the low friction on the starting face of the ball with less force requirements than would be otherwise necessary.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE PREFERRED EMBODIMENTS

Figure 1:
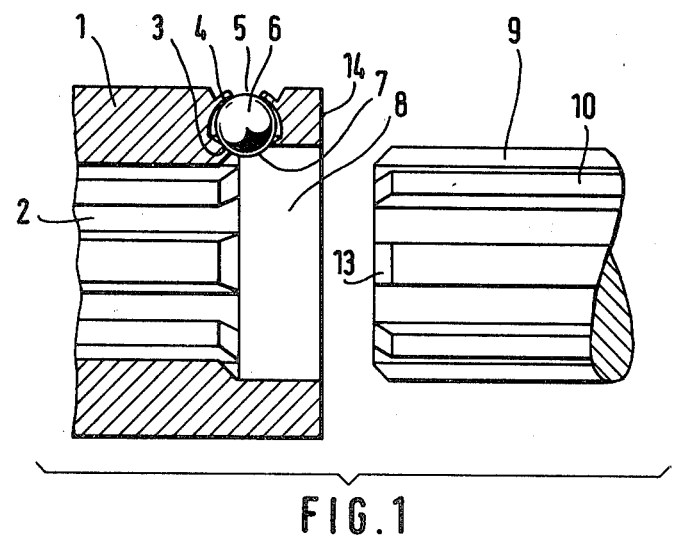
FIG. 1 is a partial sectional view taken through an assembly of a splined hub with an associated splined shaft formed in accordance with the present invention.

Referring now to the drawings and particularly to FIG. 1, there is shown an assembly in accordance with the present invention which comprises a splined hub 1 and a splined shaft 9 adapted to be inserted into torque-transmitting engagement within the splined hub 1. The splined hub 1 is formed with a slip-on end 14 through which the splined shaft 9 is inserted and at the slip-on end 14 of the hub 1 there is provided a centering cylindrical surface 8 formed with a diameter generally corresponding to the outer diameter of splines 10 on the splined shaft 9 in order to enable the centering cylindrical surface 8 to operate to align or guide the shaft 9 as it is brought into operative engagement with the hub 1.

Adjacent the surface 8 the hub 1 is provided with splines 2 adapted to engage with the splines 10 of the shaft 9. An opening 5 is formed in the wall of the splined hub 1 at the area of transition between the splines 2 and centering surface 8.

A ball 6 is rotatably held within the opening 5 so that a ball segment 7 of the ball 6 will extend into the interior of the hub 1 at the area of transition between the splines 2 and the centering surface 8.

The opening 5 is formed with an inner stop 3 and an outer stop 4 in order to operatively retain the ball 6 within the opening 5. The inner stop 3 may be formed for example by partially boring through the opening 5 and the stop 4 may be formed by a circular anchoring of the material of the splined hub around the opening 5.

In order to facilitate engagement of the shaft splines 10 into the hub 1, the ends of the splines 10 are formed with a tapered surface 13 which may be formed with a trapezoidal configuration. When the splined shaft 9 is inserted into the hub 1, the tapered surface 13 may come to rest against the ball 6. By turning the splined hub 1 relative to the shaft 9, the ball 6 may operate as a roller bearing and the ball segment 7 extending into the centering surface 8 will continue to be rotated until the ball segment finds free space in a gap formed between adjacent shaft splines 10. With the ball 6 arranged in alignment between shaft splines 10, in a manner shown in FIG. 2, the splined hub 1 and the shaft 9 may then be brought together so as to be joined in torque-transmitting engagement.

Figure 2:
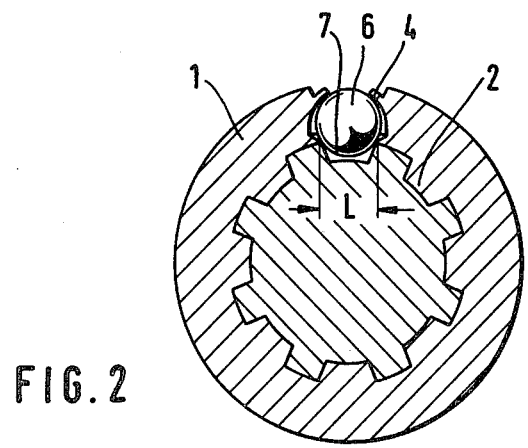
FIG. 2 is a cross-sectional view through a splined hub and shaft assembly with the shaft in the engaged position.

As seen in FIG. 2, the gap between adjacent splines 10 of the splined shaft 9 is formed with a width L and the chord of the angular ball segment 7 which extends into the interior of the hub 1 is arranged with an length identical to the width L formed between the adjacent splines 10. It will be noted therefore that the ball 6 is essentially arranged so as to occupy an angular space which would otherwise be occupied by a part of a hub spline 2.

Figure 3:
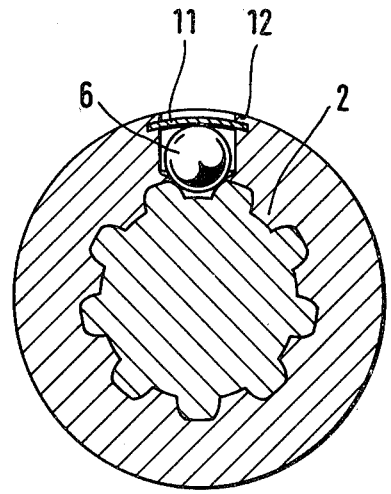
FIG. 3 is a sectional view of an engaged assembly in accordance with a further embodiment of the invention.

FIG. 3 shows a further embodiment of the invention wherein the ball 6 is held radially against the inner stop 3 of the opening 5 by means of a spring member 11 applying a radially inward force against the ball 6.

Figure 4:
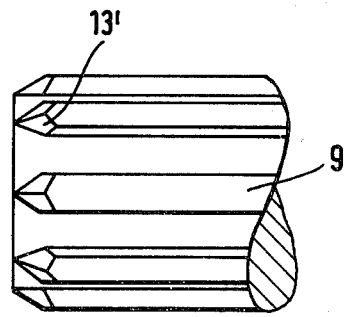
FIG. 4 is an end view of a shaft member having a splined profile in accordance with a further embodiment of the invention.

In FIG. 4 there is illustrated a further embodiment of the invention wherein the splines on the shaft 9 are formed with acuminated ends 13' in order to further facilitate guidance of the ball 6 to between splines on the shaft 9. As a result of the acuminated shaft splines instead of the splines such as those shown in FIG. 1 having the tapered surface 13, the ball 6 will be guided toward a gap between the shaft splines in order to facilitate engagement of the members.

In the embodiment wherein the ball is held against the biasing force of the spring 11, the process of introduction of the shaft 9 into the hub 1 is simplified in that if there is any offcenter contact between the ball and the shaft spline, rotation of the splined hub will be assisted by the force of the spring.

Thus, it will be seen that in accordance with the present invention advantages arise in that as a result of the use of a rotatable ball, low friction between the ball and the shaft will enable less force to be applied in joining together the hub and the shaft than would otherwise be necessary.

The opening 5 is positioned relative to the hub splines 2 so that the ball 6 will engage between shafts splines 10 when the splined shaft 9 is arranged in engagement with the splined hub 1. The axial distance between the center of the opening 5 and the end 14 of the splined hub 1 is arranged to be equal to or smaller than the axial length of the cylindrical inner centering surface 8.

The stop means, including the outer stop 4, inner stop 3, and/or the spring member 11 of the embodiment of FIG. 3 are arranged so that the greatest chord length of the ball segment 7 projecting inwardly into the hub when the splined shaft 9 and the splined hub 1 are in engagement will be equivalent to the maximum width L of the gap between individual splines 10 of the shaft 9.

While specific embodiments of the invention have been shown and described in detail to illustrate the application of the inventive principles, it will be understood that the invention may be embodied otherwise without departing from such principles.

What is claimed is:

1. A spline assembly for connecting together a pair of shafts, particularly for connecting together a power takeoff shaft of a tractor and a drive shaft of an agricultural implement, one of said shafts being a splined hub and the other being a splined shaft, comprising: hub spline means on said splined hub; a cylindrical inner centering surface extending between the termination of said hub spline means and an end of said splined hub; shaft spline means on said splined shaft arranged to be placed in torque-transmitting engagement with said hub spline means and having an outermost diameter, said cylindrical centering surface being formed with a diameter corresponding to said outermost diameter to guide said splined shaft into engagement with said splined hub; an opening extending through the wall of said splined hub having a ball located therein, said ball being arranged to have a segment thereof project inwardly into said hub to effect engagement of said ball with said splined shaft; said opening being positioned relative to said hub spline means so that said ball will engage between said shaft spline means when said splined shaft is arranged in engagement with said splined hub with the axial distance between the center of said opening and said end of said splined hub being equal to or smaller than the axial length of said cylindrical inner centering surface.

2. An assembly according to claim 1 further comprising stop means provided in said opening operatively retaining said ball therein, said stop means being arranged so that the greatest chord length of said ball segment projecting inwardly into said hub when said splined shaft and said splined hub are in engagement will be equivalent to the maximum width of the gap between individual splines of said shaft spline means.

3. An assembly according to claim 2 wherein said stop means include a spring member applying a spring force biasing said ball radially inwardly of said hub.

4. An assembly according to claim 1 wherein said shaft spline means are formed with acuminated ends tending to guide said ball into engagement between individual splines of said shaft spline means.

* * * * *